July 31, 1962 J. E. DE BAUN 3,047,310
BICYCLE DRIVING MECHANISM
Filed Nov. 9, 1959 2 Sheets-Sheet 1

INVENTOR
John E. De Baun

BY L. S. Saulsbury
ATTORNEY

INVENTOR
John E. De Baun

United States Patent Office 3,047,310
Patented July 31, 1962

3,047,310
BICYCLE DRIVING MECHANISM
John E. De Baun, 335 Marshall St., Ridgewood, N.J.
Filed Nov. 9, 1959, Ser. No. 851,696
6 Claims. (Cl. 280—261)

The present invention relates to foot pedal operated vehicles, e.g., bicycles, and more particularly relates to the provision of a greater mechanical advantage in the operation of such a vehicle.

In the operation of foot operated vehicles, e.g., bicycles, the amount of leverage applied to the sprocket which moves the chain engaging the driven wheel or wheels, depends of course on the length of the foot pedal stroke. Or, on the length of the radius of the circle in which the foot pedal crank arm revolves. The placing of the center of this circle too high raises the center of gravity of the moment of forces applied to move the vehicle. This in turn tends to make the vehicle difficult to balance, requiring not only more dexterity in handling, but also giving to the vehicle an actual, even if not theoretical disadvantage. On the other hand, the placing of the center of this circle too near the ground limits the length of the crank arm of the foot pedal. Thus, the problem is to lengthen the stroke and still not displace the sprocket upwards.

Although many attempts have been made to overcome the foregoing difficulties and other difficulties, none, as far as I know have ever been successful when carried out into actual practice.

It is an object of the present invention to provide means for increasing the driving power of a foot operated vehicle.

It is a further object of the present invention to provide an arrangement for increasing the length of the foot stroke of a foot pedal operated vehicle.

It is a further object of the present invention to provide an arrangement for increasing said stroke which is simple of construction and economical to manufacture.

The present invention also contemplates providing an arrangement which will materially increase the mechanical advantage of a foot operated vehicle without any substantial corresponding loss due to friction or other causes.

With the foregoing and other objects in view, the invention resides in the novel arrangement and combination of parts and in the details of construction hereinafter described and claimed, it being understood that changes in the precise embodiment of the invention herein disclosed may be made within the scope of what is claimed without departing from the spirit of the invention.

The invention will appear more clearly from the following detailed description when taken in connection with the accompanying drawing, showing by way of example, a preferred embodiment of the inventive idea.

Figure 3:
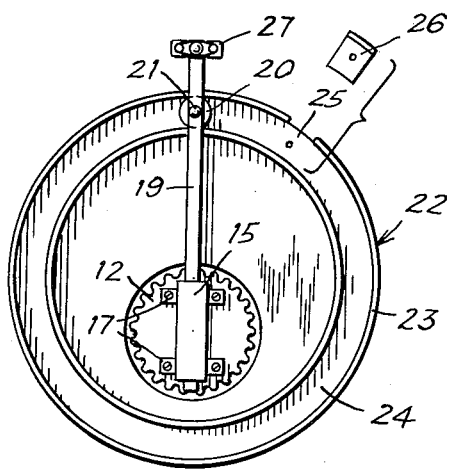
FIG. 3 shows a side view of the arrangement contemplated herein.
Figure 2:
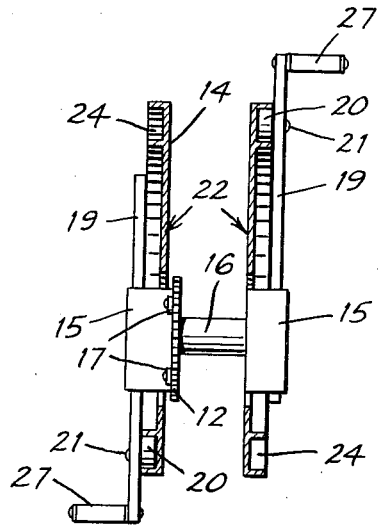
FIG. 2 illustrates a section along line 2—2 of FIGURE 1.
Figure 1:
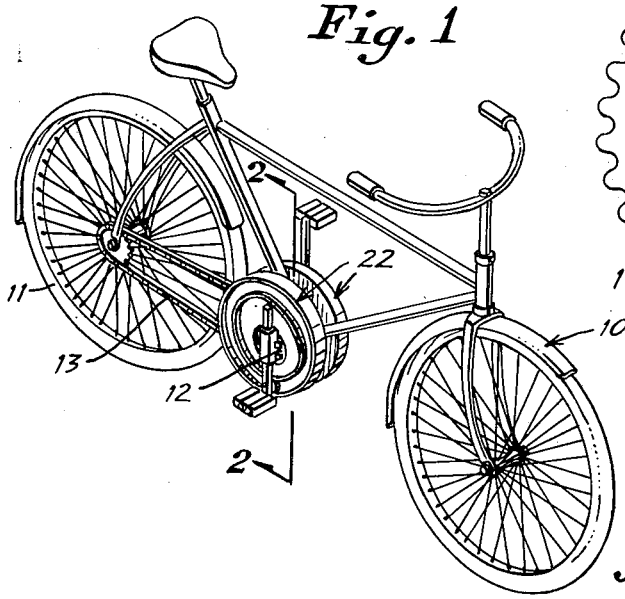
FIGURE 1 shows a bicycle provided with the arrangement contemplated herein.
Figure 4:
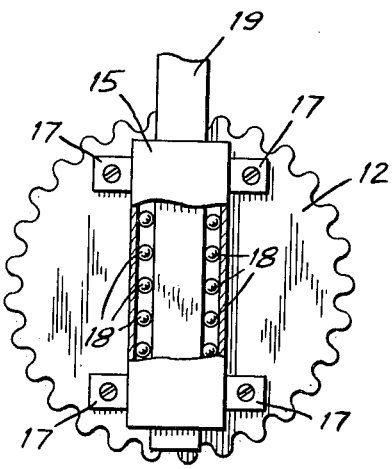
FIG. 4 depicts some of the details of construction of the arrangement shown in FIG. 3.

The invention will best be understood by reference to the drawing wherein there is shown a bicycle 10. As is usual in this type of vehicles, this bicycle is moved by actuating the rear wheel 11 by a driven sprocket 12 and chain 13. However, the bicycle shown in the drawing differs from the bicycles of the prior art in that it is provided with an assembly 14, on each side of the sprocket. This assembly comprises a housing 15, which is of an elongated shape, there being one such housing on each side of the sprocket. On the one side of the sprocket, the housing is fastened by fastenig means 17 across the diameter of the sprocket 12. The other housing is fastened to the axle of the sprocket. Inside the housing is a free space for reciprocation, and along the sides or edges in the interior, it is preferable to have bearings 18 to facilitate reciprocation. Inserted in said housing 15 is a crank arm 19. Said crank arm fits tightly in said housing, but, because of said bearings, or by lubrication, is adapted to freely reciprocate up and down therein. This arm must extend at least past the ends of said housing for some length. Towards one end of said crank arm 19 is a guide wheel or guide bearing 20. This wheel is firmly retained on said arm by a retaining pin 21. Disposed around the sprocket is an orbital path or guide track of travel, and in the case of this embodiment, a circular path of travel or guide track 22. As will be observed from the drawings the center of this path does not coincide with the center of the sprocket. On the contrary, this circular path is eccentrically disposed to said sprocket in such a manner that the sprocket and circular path are nearest towards the bottom of said sprocket and are furtherest away towards the top of the sprocket. The center of the circular path need not be directly perpendicular over the center of the sprocket. The disposition of the path may be adjustable depending on the rider. This adjustment of course would only be within certain narrow limits. Preferably, this path should have a channel 24 which is defined by flanges along the inner and outer rims of the path. These flanges 23 are so disposed as to retain guide wheel 20. In assembling the bicycle, the wheel 20 may be inserted in the channel through an opening 25 provided for said purpose. A cover 26 is also provided for such opening which may be held in place by any suitable means such as a screw or clamp. At the end of said arm, and in this case, the same end having the guide wheel 20, is a bicycle pedal 27. Advantageously, in the second embodiment, the reciprocating arm 19a will have a guide wheel 20a at one end traveling circular path 22a, but the pedal 27 will be at the end opposite to the guide wheel 20a. The members 22 are clamped to the lower reach bar and seat post of the bicycle frame.

Figure 5:
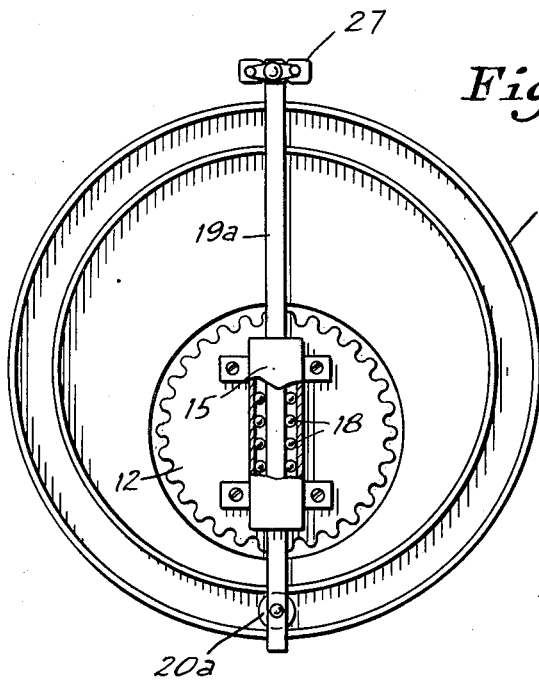
FIG. 5 shows another embodiment of the invention.
Figure 6:
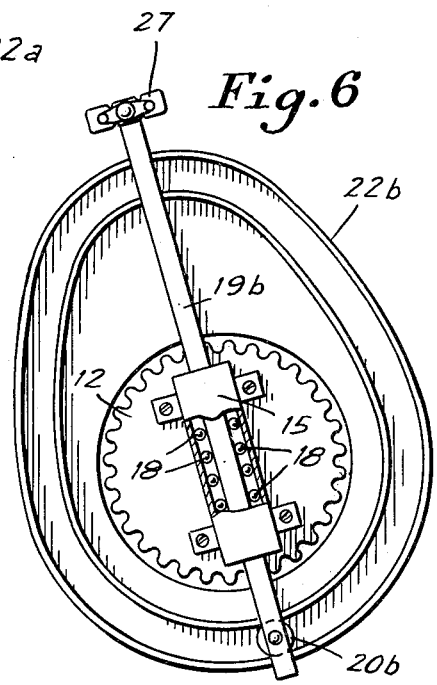
FIG. 6 shows an embodiment of the invention which may be preferable to the other two embodiments in certain cases.
Figure 7:
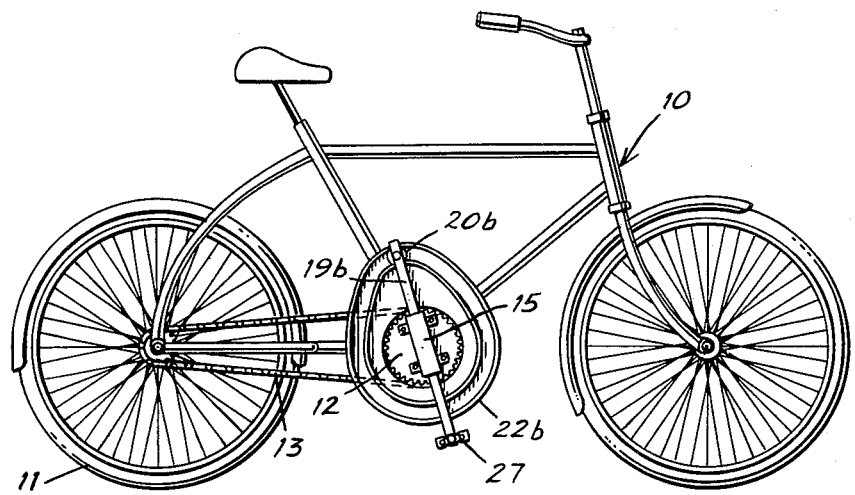
FIG. 7 shows the embodiment of FIG. 6 mounted on a bicycle.

In the embodiments depicted in FIGS. 5 and 3, the motion transmitted will be intermittent. This does not matter too much on a free-wheeling device. However, certain riders may prefer a more linear transmission of motion. This is accomplished by the embodiment of FIG. 6. As can be seen, the orbit path of travel is egg-shaped as shown at 22b. Furthermore, the orbit is inclined towards the rear of the bicycle. Thus, guide wheel 20b on arm 19 will travel a greater distance at the bottom than at the top, thus compensating for the intermittent motion. In this embodiment, pedal 27 is preferably opposite the end holding wheel 20b.

By means of the arrangement herein described, a sufficient mechanical advantage is provided to drive a bicycle up a fairly steep hill by an average person.

Although the present invention has been described in conjunction with preferred embodiments, it is to be understood that modifications and variations may be resorted to without departing from the spirit and scope of the invention as those skilled in the art will readily understand. Such modifications and variations are considered to be within the purview and scope of the invention and appended claims.

I claim:

1. In a vehicle of the character described, having wheels, one of which is driven by a chain and sprocket, in combination, a housing on each side of said sprocket; fastening means fastening one housing on one side of said sprocket to said sprocket across the diameter thereof, and on the other side to an axle secured to the other side of said sprocket; the other housing being secured to an axle projecting from the other side of said sprocket; an arm in each housing adapted to reciprocate therein and which is longer in length than each housing with the ends projecting beyond the ends of said housings; a guide wheel and pin disposed on each said arms towards one of said projecting ends; and retaining means retaining each said guide wheel and pin on each said arms for rotation in a ring-like orbit path of travel, each said guide wheel being caused to travel along said orbit path, said orbit path being disposed so that the geometric center thereof is substantially over and above the center of said sprocket, and the lower rim edge of said path being above the horizontal level of the wheels of the vehicle; and, a pedal on one of the ends of each said arms.

2. A device as claimed in claim 1, said orbit path being circular.

3. A device as claimed in claim 1, said orbit path being egg-shaped, the geometric center of said egg-shaped path being above and to the rear of the center of said sprocket.

4. A device as claimed in claim 1, said orbit path being circular and said guide wheels and pedals being at the same end of said arms.

5. A device as claimed in claim 1, said orbit path being circular and said guide wheels and pedals being at opposite ends of said arms.

6. A device as claimed in claim 1, said orbit path being egg-shaped, the geometric center of said egg-shaped path being above and to the rear of the center of said sprocket, and said guide wheels and pedals being at opposite ends of said arms.

References Cited in the file of this patent

UNITED STATES PATENTS

| | | |
|---|---|---|
| 599,445 | Freeman et al. | Feb. 22, 1898 |
| 627,240 | Stech | June 20, 1899 |
| 1,060,774 | Lupton | May 6, 1913 |
| 2,782,647 | Wildhaber | Feb. 26, 1957 |

FOREIGN PATENTS

| | | |
|---|---|---|
| 331,073 | Italy | Oct. 29, 1935 |
| 402,444 | Italy | Mar. 9, 1943 |